(12) United States Patent
Ling et al.

(10) Patent No.: US 12,338,141 B2
(45) Date of Patent: Jun. 24, 2025

(54) METHOD FOR STABILIZING HEAVY METAL AND ANTIBIOTIC BY COUPLING SLOW MINERALIZATION OF CALCIUM PHOSPHATE LIQUID PRECURSOR WITH CONTINUOUS FLOW

(71) Applicant: TONGJI UNIVERSITY, Shanghai (CN)

(72) Inventors: Lan Ling, Shanghai (CN); Xin Qiao, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/733,953

(22) Filed: Jun. 5, 2024

(65) Prior Publication Data

US 2025/0042777 A1    Feb. 6, 2025

(30) Foreign Application Priority Data

Aug. 3, 2023   (CN) .......................... 202310968448.1

(51) Int. Cl.
*C02F 1/28* (2023.01)
*B01J 20/04* (2006.01)
(Continued)

(52) U.S. Cl.
CPC .............. *C02F 1/288* (2013.01); *B01J 20/048* (2013.01); *B01J 20/28052* (2013.01);
(Continued)

(58) Field of Classification Search
CPC ...... C02F 1/00; C02F 1/001; C02F 1/28–288; C02F 1/34; C02F 1/36; C02F 1/42; C02F 1/44–445; C02F 1/52–56; C02F 1/62; C02F 1/64; C02F 1/66; C02F 1/68–688; C02F 2101/20–22; C02F 2101/30;
(Continued)

(56) References Cited

U.S. PATENT DOCUMENTS 6,372,333 B1 *   4/2002   Sugiyama .............. D21H 11/20
                                                   428/312.4
2004/0159605 A1   8/2004   Hughes
(Continued)

FOREIGN PATENT DOCUMENTS

| CN | 106660794 A |   | 5/2017 |  |
|---|---|---|---|---|
| CN | 108786743 A |   | 11/2018 |  |
| CN | 113145060 A | * | 7/2021 | ............ B01J 20/048 |

OTHER PUBLICATIONS

Machine translation of CN-113145060-A, pp. 1-8. (Year: 2021).*
(Continued)

*Primary Examiner* — Clare M Perrin
(74) *Attorney, Agent, or Firm* — JEEN IP LAW, LLC

(57) ABSTRACT

A method for stabilizing heavy metals and antibiotics by coupling slow mineralization of a calcium phosphate liquid precursor with a continuous flow of contaminants is provided. In the method, a mixed solution containing a calcium salt, a phosphate, collagen and a polymer is pumped into a packed column with a wet packing method. To-be-treated sewage is pumped into the packed column, and heavy metals and antibiotics in the to-be-treated sewage are solidified and removed during mineralization of calcium phosphate.

9 Claims, 5 Drawing Sheets

--- pumping, with a wet packing method, a mixed solution containing a calcium salt, a phosphate, collagen, and a polymer into a packed column pumping to-be-treated sewage into the packed column, and solidifying and removing heavy metals and antibiotics in the to-be-treated sewage during mineralization of calcium phosphate

(51) Int. Cl.
- *B01J 20/28* (2006.01)
- *B01J 20/32* (2006.01)
- *C02F 1/44* (2023.01)
- *C02F 1/52* (2023.01)
- *C02F 1/62* (2023.01)
- *B01J 20/16* (2006.01)
- *B01J 20/20* (2006.01)
- *C02F 101/20* (2006.01)
- *C02F 101/30* (2006.01)

(52) U.S. Cl.
CPC .......... *B01J 20/3268* (2013.01); *C02F 1/44* (2013.01); *C02F 1/5236* (2013.01); *C02F 1/62* (2013.01); *B01J 20/16* (2013.01); *B01J 20/20* (2013.01); *C02F 2101/20* (2013.01); *C02F 2101/30* (2013.01); *C02F 2201/002* (2013.01)

(58) Field of Classification Search
CPC ...... C02F 2101/32; C02F 2103/00–005; C02F 2103/34; C02F 2103/343; C02F 2201/002; B01J 20/00; B01J 20/04; B01J 20/048; B01J 20/10; B01J 20/16; B01J 20/18; B01J 20/186; B01J 20/20; B01J 20/22; B01J 20/24; B01J 20/26; B01J 20/261; B01J 20/262; B01J 20/28052; B01J 20/30; B01J 20/3242; B01J 20/3268; B01J 20/3092; B01J 20/327; B01J 20/3272; Y10S 977/903; C04B 12/02–027

See application file for complete search history.

(56) References Cited

U.S. PATENT DOCUMENTS

| | | | |
|---|---|---|---|
| 2005/0026003 A1* | 2/2005 | Kim | C01B 25/32 428/704 |
| 2006/0102557 A1* | 5/2006 | Hurley | B01D 46/80 210/502.1 |
| 2017/0165659 A1 | 6/2017 | Kolomitsyn et al. | |

OTHER PUBLICATIONS

Notification to Grant Patent Right for Invention, Chinese Application No. 202310968448.1, mailed Apr. 2, 2024 (3 pages).

CNIPA, Office Action issued for Chinese Application No. 202310968448.1, mailed Jan. 16, 2024 (14 pages).

\* cited by examiner

METHOD FOR STABILIZING HEAVY METAL AND ANTIBIOTIC BY COUPLING SLOW MINERALIZATION OF CALCIUM PHOSPHATE LIQUID PRECURSOR WITH CONTINUOUS FLOW

CROSS-REFERENCE TO RELATED APPLICATIONS

This application claims priority to Chinese Patent Application No. 202310968448.1, filed on Aug. 3, 2023, which is hereby incorporated by reference in its entirety.

TECHNICAL FIELD

The present disclosure relates to the technical field of sewage treatment, particularly a method for stabilizing heavy metals and antibiotics by coupling slow mineralization of a calcium phosphate liquid precursor with a continuous flow of contaminants.

BACKGROUND

With the rapid development of industries such as metal electroplating facilities, mining operations, fertilizer industry, tanneries, batteries, paper industry and pesticides, more and more heavy metal wastewater is directly or indirectly discharged into the environment, especially in developing countries. Toxic heavy metals of particular concern in the treatment of industrial wastewater include zinc, copper, nickel, mercury, cadmium, lead and chromium. Heavy metal wastewater is non-biodegradable, and heavy metal ions are easily accumulated in organisms, which directly or indirectly endanger human health through ecosystems and food chains. In addition, under more and more strict laws and regulations, heavy metals are dominating environmental pollutants and have become one of the most severe environmental problems. With the increase in cancer prevalence, the demand for anti-tumor drugs in countries is proliferating. Among them, doxorubicin (DOX) is a broad-spectrum antineoplastic drug. However, DOX cannot be entirely absorbed by the body or degraded. Therefore, the residual antineoplastic drugs can easily accumulate in nature, causing neurological and genetic toxicity to typical organisms through the biomagnification effect. Thus, these toxic heavy metals and anti-tumor drugs should be removed from the wastewater to protect human beings and the environment. Currently, methods for removing heavy metal ions include chemical precipitation, ion exchange, adsorption, membrane filtration, electrochemical treatment technology, etc. Methods for removing anti-tumor drugs mainly include a biological method, adsorption, catalysis and electrochemical treatment, but these methods have their own advantages and disadvantages. Under the research environment of advocating green chemistry, it is necessary to find a green material with more effective advantages in removing heavy metals and anti-tumor drugs. It is particularly important to develop an efficient and stable method for solidifying heavy metals from the perspectives of basic materials physics and chemistry, based on the physical and chemical characteristics of materials themselves through regulation of material synthesis process.

The existing technology needs to be improved and developed.

SUMMARY

In view of the shortcomings of the prior art, the purpose of the present disclosure is to provide a method for stabilizing heavy metals and antibiotics by coupling slow mineralization of a calcium phosphate liquid precursor with a continuous flow of contaminants, aiming at solving the problem that the prior art cannot efficiently and stably remove heavy metals from the wastewater.

The technical schemes of the present disclosure are as follows.

A method for stabilizing heavy metals and antibiotics by coupling slow mineralization of a calcium phosphate liquid precursor with a continuous flow of contaminants is provided, and the method includes steps of:
 pumping, with a wet packing method, a mixed solution containing a calcium salt, a phosphate, collagen and a polymer into a packed column; and
 pumping to-be-treated sewage into the packed column, and solidifying and removing heavy metals and antibiotics in the to-be-treated sewage during mineralization of calcium phosphate.

In the method for stabilizing heavy metals and antibiotics by coupling slow mineralization of a calcium phosphate liquid precursor with a continuous flow of contaminants, the pumping, with the wet packing method, the mixed solution containing the calcium salt, the phosphate, the collagen and the polymer into the packed column, includes:
 generating a calcium salt stock solution and a phosphate stock solution by dissolving the calcium salt and the phosphate in Tris buffers respectively;
 adding the polymer into the calcium salt stock solution until a concentration of the polymer reaches 10 mg/L-100 mg/L, to obtain a calcium salt mixed solution;
 adding the collagen into the calcium salt mixed solution and performing ultrasonic treatment on the obtained solution, and then adding the phosphate stock solution in such a manner that a final concentration ratio of the calcium salt and the phosphate is greater than or equal to 1.67, thereby obtaining the mixed solution; and
 pumping, with the wet packing method, the mixed solution into the packed column.

In the method for stabilizing heavy metals and antibiotics by coupling slow mineralization of a calcium phosphate liquid precursor with a continuous flow of contaminants, the calcium salt is one or more selected from $CaCl_2$, $Ca(NO_3)_2$ and $CaSO_4$, and the phosphate is $K_2HPO_4$.

In the method for stabilizing heavy metals and antibiotics by coupling slow mineralization of a calcium phosphate liquid precursor with a continuous flow of contaminants, a concentration of the calcium salt in the mixed solution is 5 mM-10 mM, and a concentration of the phosphate in the mixed solution is 2 mM-6 mM.

In the method for stabilizing heavy metals and antibiotics by coupling slow mineralization of a calcium phosphate liquid precursor with a continuous flow of contaminants, the polymer is one or more selected from polyacrylic acid, polyglutamic acid and polyaspartic acid.

In the method for stabilizing heavy metals and antibiotics by coupling slow mineralization of a calcium phosphate liquid precursor with a continuous flow of contaminants, the collagen concentration in the mixed solution is 0.1 g/L-20 g/L.

In the method for stabilizing heavy metals and antibiotics by coupling slow mineralization of a calcium phosphate liquid precursor with a continuous flow of contaminants, a semi-permeable membrane is provided at a water outlet of the packed column, and the semi-permeable membrane is configured to allow water molecules and ions to penetrate through and intercept the polymer, minerals, and the liquid precursor.

In the method for stabilizing heavy metals and antibiotics by coupling slow mineralization of a calcium phosphate liquid precursor with a continuous flow of contaminants, the packed column is filled with an auxiliary material in advance, and the auxiliary material is one or more selected from quartz sand, zeolite, ceramsite, and activated carbon.

In the method for stabilizing heavy metals and antibiotics by coupling slow mineralization of a calcium phosphate liquid precursor with a continuous flow of contaminants, the porosity of the packed column is 30%-75%, and the packing density of the auxiliary material in the packed column is 1.2 g/cm3-3.2 g/cm3-3.2.

In the method for stabilizing heavy metals and antibiotics by coupling slow mineralization of a calcium phosphate liquid precursor with a continuous flow of contaminants, the flow rate of the to-be-treated wastewater in the packed column is 0.15 mL/min to 0.9 mL/min.

The present disclosure brings about advantages as follows. In the present disclosure, a mixed solution containing a calcium salt, a phosphate, collagen, and a polymer is quickly pumped into a packed column using a wet packing method. Then, in a process of continuously pumping, into the packed column, the sewage containing heavy metals or a combination of heavy metals and antibiotics, using controlled slow mineralization of the calcium phosphate liquid precursor, the heavy metals or the composite of heavy metals and antibiotics in the sewage are removed through adsorption and in-structure stabilization by a disordered and large-surface structure of the liquid precursor. In the present disclosure, the polymer is added to the calcium salt solution, and the phosphate solution, and the polymer induces the generation of the liquid precursor (PILP). The PILP is dispersed in the gaps of sand grains in the packed column, which increases the contact and interaction with the sewage flow. Using the controlled slow mineralization, the heavy metals or the composite pollutants of heavy metals and antibiotics in the continuous inflow can be stably combined, in the mineralization process, into the particular ordered pore structure of collagen fiber-induced mineralization. In mineral crystal growth, a liquid-like surface continuously adsorbs flowing heavy metal ions and antibiotics, thereby realizing efficient and orderly structure-based "encapsulation-type" immobilization of the heavy metals and antibiotics. This removal method based on in-structure stabilization can effectively remove the heavy metals and antibiotics in the sewage and reduce the risk of secondary pollution.

DESCRIPTION OF EMBODIMENTS

The present disclosure provides a method for stabilizing heavy metals and antibiotics by coupling slow mineralization of a calcium phosphate liquid precursor with a continuous flow. To make the purpose, technical schemes, and effects of the present disclosure clearer and more definite, the present disclosure will be further described in detail below. It is understandable that the specific embodiments described here are only used to explain the present disclosure, not to limit the present disclosure.

Figure 1:
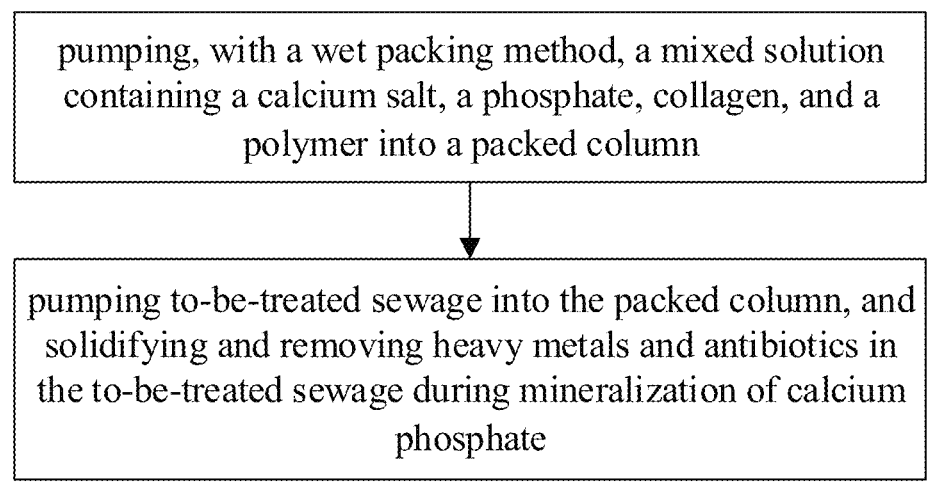
FIG. 1 is a flow chart of a method for stabilizing heavy metals and antibiotics by coupling the slow mineralization of a calcium phosphate liquid precursor with a continuous flow of contaminants, according to embodiments of the present disclosure.

Referring to FIG. 1, a flow chart of a method for stabilizing heavy metals and antibiotics by coupling the slow mineralization of a calcium phosphate liquid precursor with a continuous flow of contaminants is illustrated. As shown in the figure, the method includes the following steps:

S10, pumping, with a wet packing method, a mixed solution containing a calcium salt, a phosphate, collagen and a polymer into a packed column; and S20, pumping to-be-treated sewage into the packed column, and solidifying and removing heavy metals and antibiotics in the to-be-treated sewage during mineralization of calcium phosphate.

Specifically, research has found that local concentration of calcium and phosphate ions chelated by polymers can induce liquid-liquid separation, resulting in nano-scale "droplets" of an amorphous precursor. These droplets are highly hydrated and have fluid characteristics. This polymer-induced liquid precursor (PILP) process has been demonstrated to occur in both system calcium carbonate and phosphate system. The fluid calcium phosphate precursor formed by the PILP process has good fluidity and can diffuse into the pores of collagen fibers through capillary force. Once this ion-rich infiltrates the fibril, excess water is discharged, and the amorphous phase solidifies and crystallizes into a stable phase HA. From the point of view of pollutant treatment, the materials based on the PILP process and its induction have characteristics of weak crystallization, large specific surface area, high reactivity, and particular morphology, and have the potential to become an ideal adsorbent for a controllable process of efficiently and stably immobilizing heavy metals and the combination of heavy metals and antibiotics and for accurate control of the synthesis. Also, based on the tendency of spontaneous order of the generated PILP phase, pollutants will be brought into the spontaneously formed high crystallinity phase.

In the present disclosure, based on the unique properties and processes of PILP, the efficient immobilization of pollutants is strategically realized through the polymer-induced liquid precursor (PILP) process. In the present disclosure, the PILP process is achieved, by adding the polymer, in the synthesis process of calcium phosphate (hydroxyapatite) minerals. The PILP is dispersed in the gaps of sand grains in the packed column, increasing contact and interaction with the sewage flow. Using controlled slow mineralization, the heavy metals or the composite pollutants of heavy metals and antibiotics in the continuous inflow can be stably combined into the particular ordered pore structure of collagen fiber-induced mineralization. In mineral crystal growth, the heavy metal ions and antibiotics are absorbed on a liquid-like surface, thereby realizing efficient and orderly structure-based "encapsulation-type" immobilization of the heavy metals and antibiotics. This removal method based on in-structure stabilization can effectively remove heavy metals and antibiotics and reduce the risk of secondary pollution.

In the present disclosure, the polymer is used as a guiding agent in the PILP process, and the hydroxyapatite is biomimetically synthesized by simulating the biomineralization process so the biocompatibility is excellent. Based on the PILP process in the calcium phosphate biomineralization, the sewage containing heavy metals or the combination of heavy metals and antibiotics is continuously input. The PILP phase has a high hydration degree and fluidity. The materials generated based on the PILP process and its induction have characteristics of weak crystallization, hydration structure, large specific surface area, high reactivity, metastable structure, and the like; as such, the heavy metals and antibiotics can be immobilized in mineral crystals through ion exchange or adsorption.

In some embodiments, the pumping, with the wet packing method, the mixed solution containing the calcium salt, the phosphate, the collagen and the polymer into the packed column, includes generating a calcium salt stock solution and a phosphate stock solution by dissolving the calcium salt and the phosphate in Tris buffers respectively; adding the polymer into the calcium salt stock solution until a concentration of the polymer reaches 10 mg/L-100 mg/L, to obtain a calcium salt mixed solution; adding the collagen into the calcium salt mixed solution and performing ultrasonic treatment therefor for 30 min-3 h, and then adding the phosphate stock solution in such a manner that a final concentration ratio of the calcium salt and the phosphate is greater than or equal to 1.67, thereby obtaining the mixed solution; and pumping, with the wet packing method, the mixed solution into the packed column.

In the embodiments, the calcium salt is one or more selected from CaCl2, Ca(NO3)2 and CaSO4, but it is not limited thereto. The phosphate is K2HPO4, but it is not limited thereto. In the mixed solution, the concentration of the calcium salt is 5 mM-10 mM, the concentration of the phosphate is 2 mM-6 mM, and the concentration of the collagen is 0.1 g/L-20 g/L.

In the embodiments, the polymer is one or more selected from polyacrylic acid, polyglutamic acid and polyaspartic acid, but it is not limited thereto. For example, the polymer is polyaspartic acid sodium salt with a relative molecular weight of 3100-24800 Da, and the addition amount of the polymer in the mixed solution is 10 mg/L-100 mg/L.

In some embodiments, a semi-permeable membrane is provided at a water outlet of the packed column, and the semi-permeable membrane is configured to allow water molecules and ions to penetrate through and intercept the polymer, minerals and the liquid precursor.

In some embodiments, the packed column is filled with an auxiliary material in advance, and the auxiliary material is one or more selected from quartz sand, zeolite, ceramsite and activated carbon, but it is not limited thereto. The porosity of the packed column is 30%-75%, preferably 40%-70%. The packing density of the auxiliary material in the packed column is 1.2 g/cm3-3.2 g/cm3, preferably 1.5 g/cm3-2.8 g/cm3.

In some embodiments, the flow rate of the to-be-treated wastewater in the packed column is 0.15 mL/min to 0.9 mL/min, preferably 0.25 mL/min-0.75 mL/min.

In some embodiments, the heavy metal contained in the to-be-treated sewage is one or more of Cd (II), Cs (I), Ni (II), Cu (II), Pd (II), and Zn (II), but it is not limited thereto.

The present disclosure is further explained through specific examples:

Example 1

1. Preparation of an initial mineralizing solution in the present disclosure: a pH value was kept at 7.4 during the reaction. A calcium salt and a dihydrogen phosphate were dissolved in tris buffers, respectively, to obtain a calcium salt stock solution with a concentration of 9 mM and a dihydrogen phosphate stock solution with a concentration of 5.4 mM. Polyaspartic acid was used as a guiding agent in the PILP process. Before adding the phosphate stock solution, a polymer (polyacrylic acid, polyglutamic acid and polyaspartic acid, etc.) was added into the calcium salt CaCl2·2H2O stock solution with a concentration of 9 mM until a concentration of the polymer reached 20 mg/L, thereby obtaining a mineralizing solution. Collagen fiber with a concentration of 0.1 g/L was immersed into the mineralizing solution and subjected to ultrasonic treatment for a period of time. Finally, the dihydrogen phosphate stock solution was added in such a manner that the final concentration of the calcium salt was 4.6 mM Ca2+, and the final concentration of the phosphate was 2.7 mM PO43+ while ensuring that Ca: P is greater than or equal to 1.67, thereby obtaining the mixed solution, that is, an initial mineralizing solution.

2. Application instance: After the initial mineralizing solution was introduced into the packed column, a heavy metal Cd2+ solution was slowly introduced.

The inner diameter of the packed column was 3 cm and the diameter thereof was 30 cm. The auxiliary material of the packed column was quartz sand, and the porosity in the packed column was 50%. A water stop clip was placed at the water outlet of the packed column, and the initial mineralizing solution with a total volume of 100 ml was rapidly pumped into the packed column. A semi-permeable membrane was placed at the tail of the packed column, where the semi-permeable membrane is impermeable to polymers and minerals. Simulated wastewater was prepared as a solution containing Cd2+ in 10 mg/L, and the simulated wastewater was pumped into the packed column by a peristaltic pump at room temperature. The inflow rates of the heavy metal were controlled at 0.5 ml/min, 2 ml/min, 5 ml/min, and 10 ml/min, and the concentration of the heavy metal in the effluent solution was tested. The testing instrument was inductively coupled plasma atomic emission spectrometry (ICP-OES). The results are shown in FIG. 2.

Figure 3:
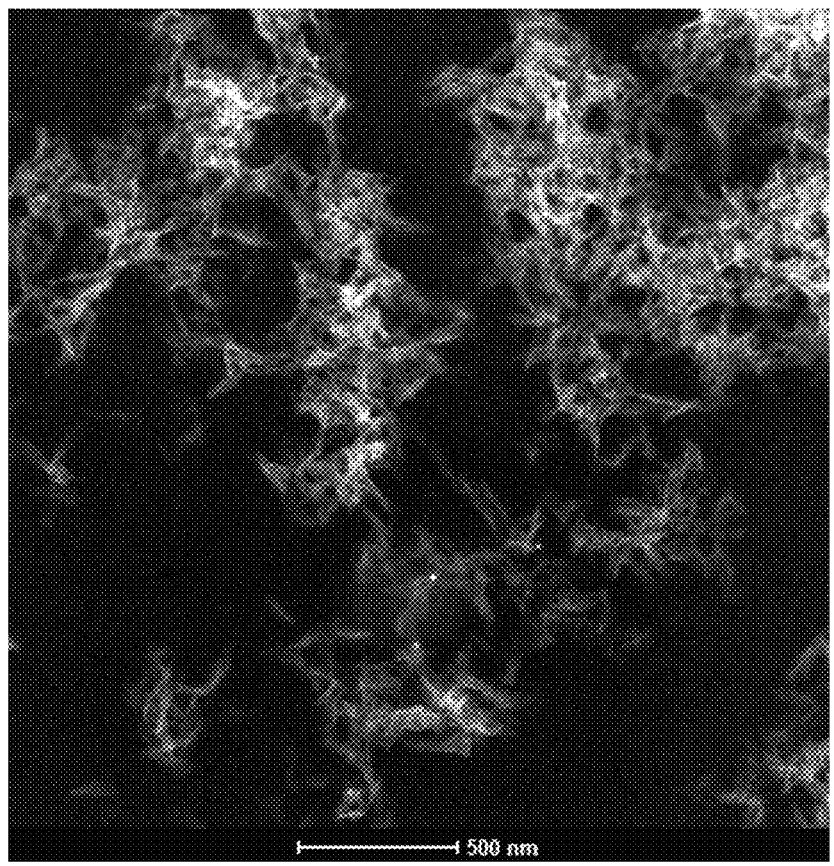
FIG. 3 are diagrams illustrating the morphology of the calcium phosphate precursor after mineralization.
Figure 3:
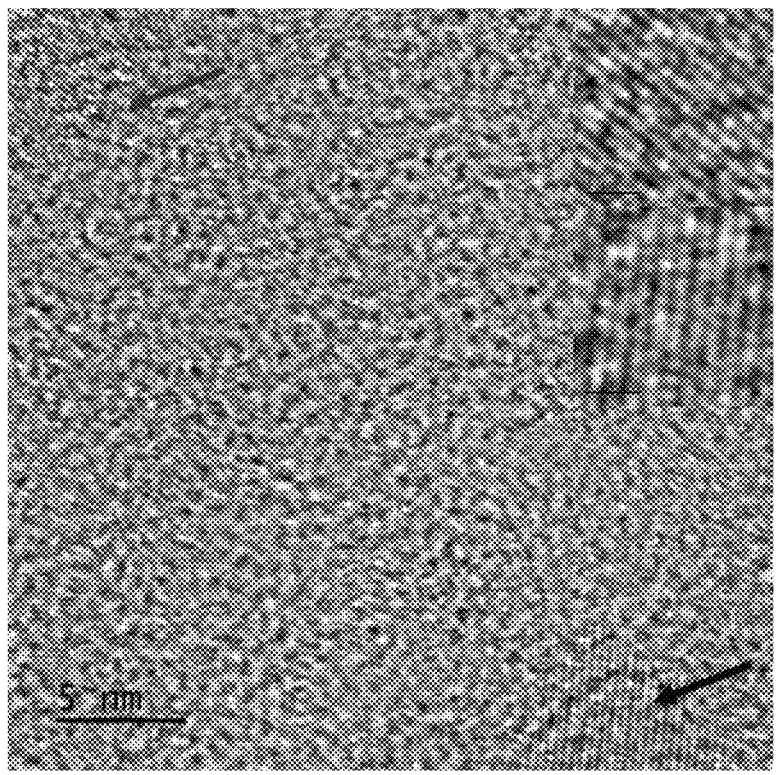

Material Characterization:

Transmission electron microscope (TEM) scanned the morphology of the calcium phosphate precursor after mineralization. From images of the high-resolution transmission electron microscope, there are a large number of nanocrystals with a variety of crystal orientations (002) and (211) (as shown in FIG. 3). Hydroxyapatite nanocrystals were directionally arranged in the fiber, and a large number of narrow spaces were constituted, which structure would play an important role in the subsequent adsorption process. Different from the hydroxyapatite synthesized by common methods, the polymer can be used to chelate and concentrate ionic substances, reducing the energy barrier in the crystallization process and thus making the generated nanocrystals have lower crystallinity. In addition, the polymer delayed the nucleation or it grew long enough to produce a metastable solution, and the stable ACP precursor penetrated through the interstitial region into the interstitial space of the fibril and gradually crystallize, which can make the nanocrystals present an ordered structure with multiple crystal orientations.

Figure 2:
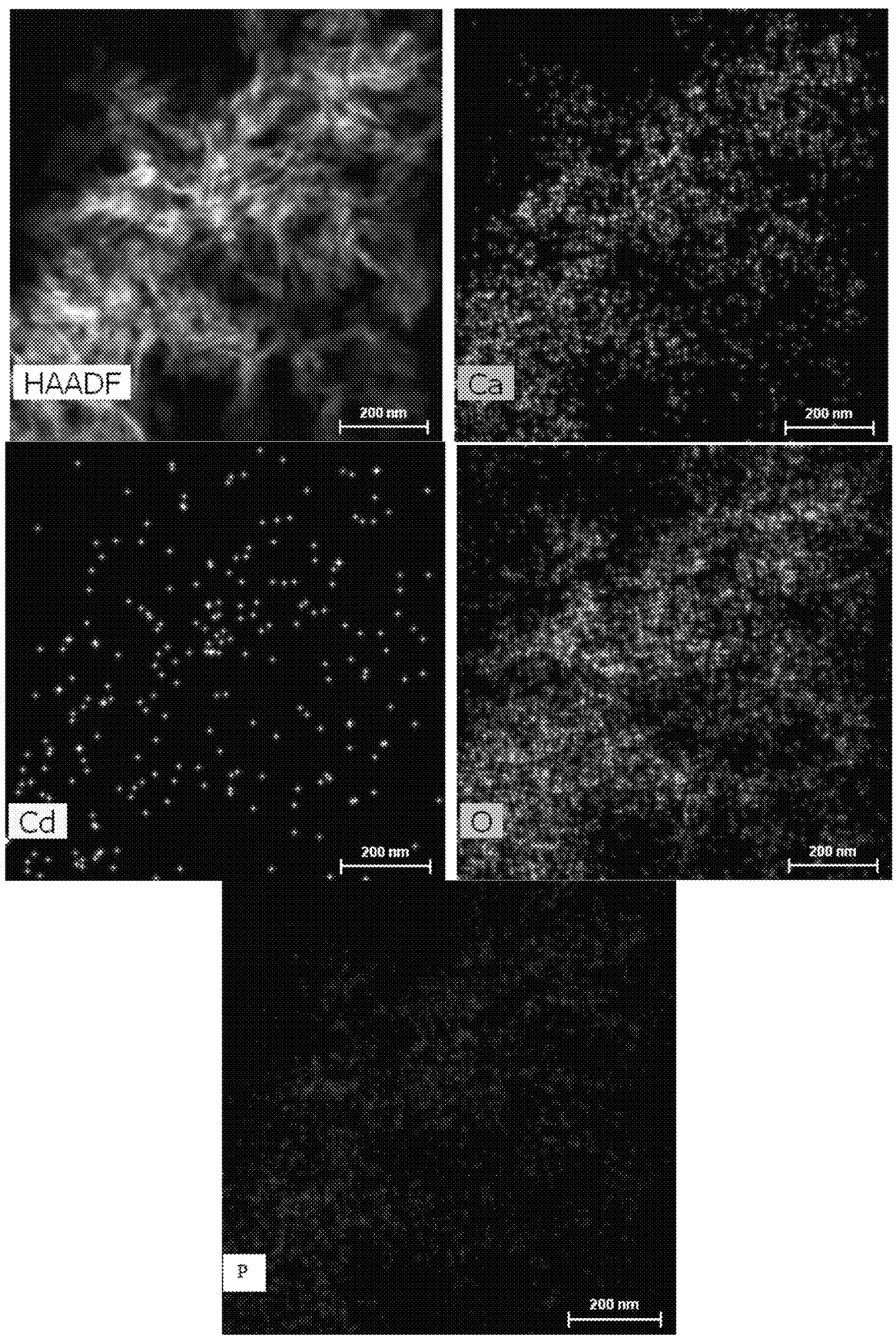
FIG. 2 are diagrams illustrating distribution of elements during slow mineralization of a calcium phosphate liquid precursor for removing a heavy metal Cd2+.
Figure 4:
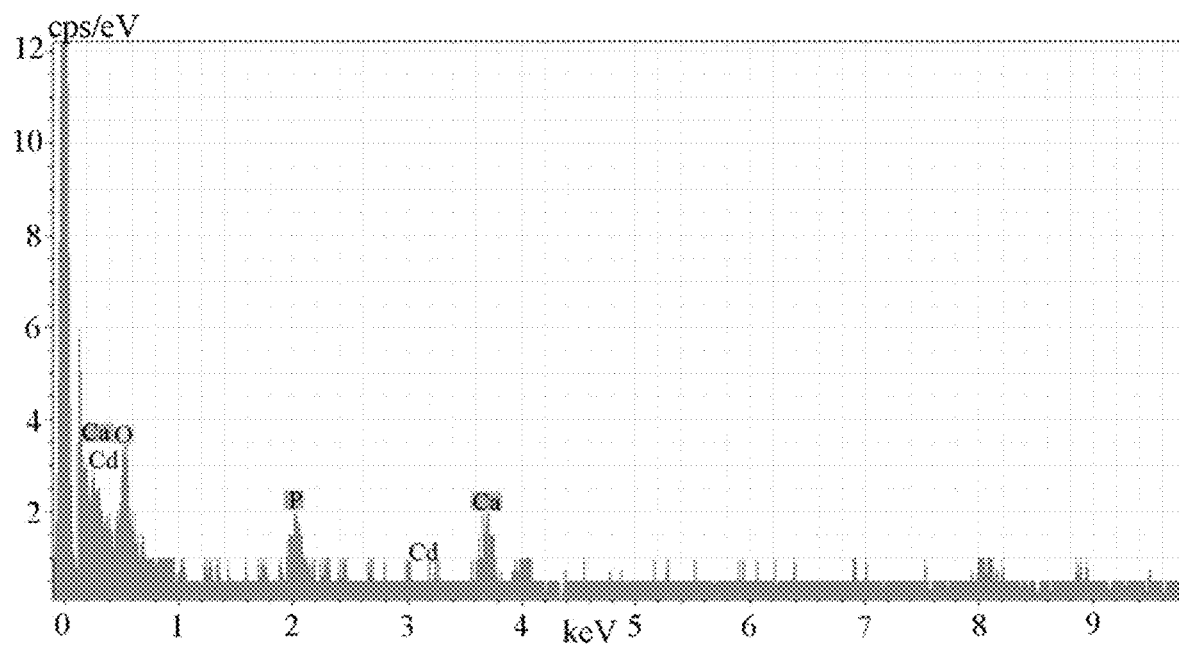
FIG. 4 illustrates an EDS energy spectrum for removal of heavy metal Cd2+ by hydroxyapatite synthesized in a PILP process.

FIG. 2 are diagrams illustrating the distribution of elements during slow mineralization of the calcium phosphate liquid precursor for removing heavy metal Cd2+. Combined with the EDS energy spectrum of FIG. 4, it can be seen that the heavy metal Cd2+ can be effectively immobilized by the calcium phosphate mineralization process based on the PILP process.

Figure 5:
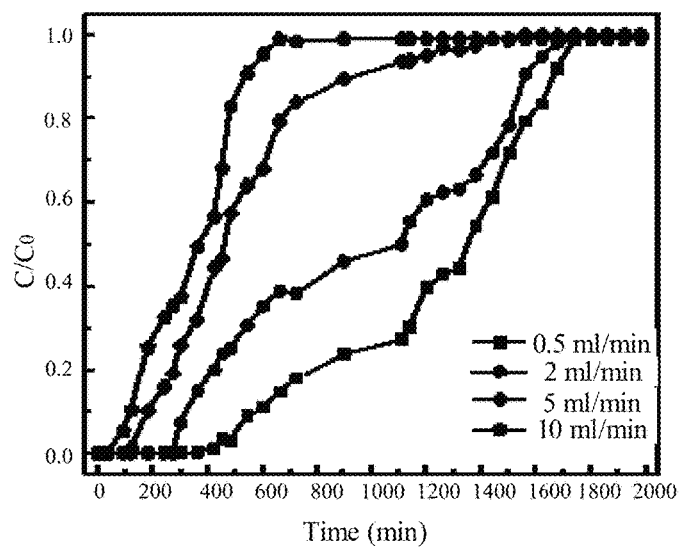
FIG. 5 illustrates an absorption breakthrough curve of Cd2+ at different flow rates in Example 1.

Application Effects:

As can be seen from FIG. 5, the simulated solution containing Cd2+ in 10 mg/L was continuously fed into the experimental column at different flow rates. The ratio of the concentration of Cd2+ in the simulated solution at the time of flowing out of the experimental column to the concentration of thereof at the water inlet changed with time. The retention time of the simulated solution in the experimental column was 360 min, 300 min, 120 min and 90 min respectively for the flow rates of 0.5 ml/min, 2 ml/min, 5 ml/min, and 10 ml/min. When the effluent concentration of Cd2+ is equal to the input concentration thereof, the breakthrough point is reached.

Example 2

1. Preparation of the initial mineralizing solution in the present disclosure: the ratio of components in the initial mineralizing solution was the same as that in Example 1, but the dosages of the calcium salt and the dihydrogen phosphate were both increased respectively. The concentration of the calcium salt was twice that in Example 1, and the concentration of the dihydrogen phosphate was twice that in Example 1.
2. Application instance: After the mineralizing solution was introduced into the packed column, a heavy metal Cd2+ solution was slowly introduced.

The inner diameter of the packed column was 3 cm, and the diameter was 30 cm. The auxiliary material of the packed column was quartz sand, and the porosity in the packed column was 50%. A water stop clip was placed at the water outlet of the packed column, and the initial mineralizing solution with a total volume of 100 ml was rapidly pumped into the packed column. A semi-permeable membrane was placed at the tail of the packed column, so that the polymers and minerals could not penetrate through. Simulated wastewater was prepared as a solution containing Cd2+ in 10 mg/L, and the simulated wastewater was pumped into the packed column by a peristaltic pump at room temperature. The inflow rate of the heavy metal was controlled at 0.5 ml/min, and the concentration of the heavy metal in the effluent solution was tested. The testing instrument was inductively coupled plasma atomic emission spectrometry (ICP-OES). The results are shown in FIG. 6.

Figure 6:
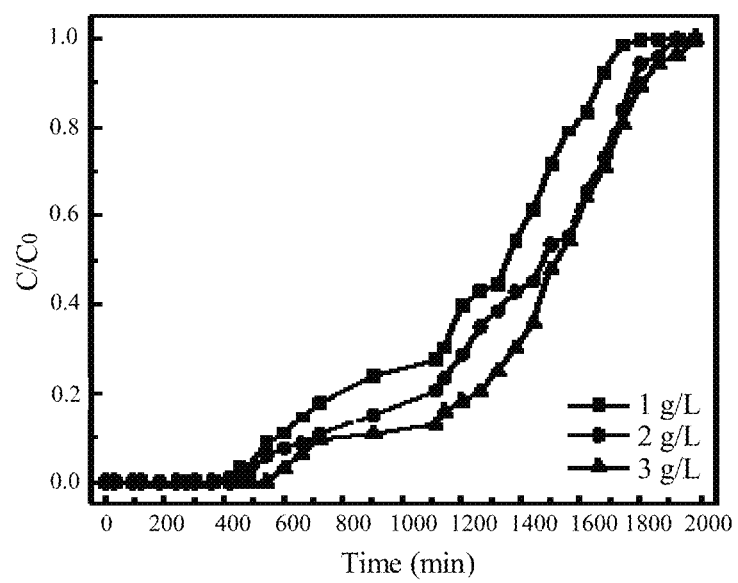
FIG. 6 illustrates the adsorption breakthrough curve of Cd2+ with different dosages of mineralized materials in Example 2.

Application Effects:

As can be seen from FIG. 6, under different dosages of the mineralizing solution, the simulated solution containing Cd2+ in 10 mg/L was continuously fed into the experimental column at the flow rate of 0.5 ml/min. The ratio of the concentration of Cd2+ in the simulated solution at the time of flowing out of the experimental column to the concentration of thereof at the water inlet changed with time. It can be clearly seen that the time point at which Cd2+ began to flow out of the packed column was increased with the increase of the dosage, and the time to reach the blasting point also increased with the increase of the dosage.

Example 3

1. Preparation of the initial mineralizing solution in the present disclosure: the ratio of components in the initial mineralizing solution was the same as that in Example 1.
2. Application instance: After the mineralizing solution was introduced into the packed column, a mixed solution containing Cd2+ in 10 mg/L and doxorubicin hydrochloride (DOX) in 1 mg/L was slowly introduced.

The inner diameter of the packed column was 3 cm and the diameter was 30 cm. The auxiliary material of the packed column was quartz sand, and the porosity in the packed column was 50%. A water stop clip was placed at the water outlet of the packed column, and the initial mineralizing solution with a total volume of 100 ml was rapidly pumped into the packed column. A semi-permeable membrane was placed at the tail of the packed column, so that the liquid precursor formed by the mixture could not penetrate the semi-permeable membrane. Simulated wastewater was prepared as a mixed solution containing Cd2+ in 10 mg/L and doxorubicin hydrochloride (DOX) in 1 mg/L, and the simulated wastewater was pumped into the packed column by a peristaltic pump at room temperature. The inflow rate of the mixed solution was controlled at 0.5 ml/min, and the concentration of the Cd2+ in the effluent solution was tested. The testing instrument was inductively coupled plasma atomic emission spectrometry (ICP-OES). The concentration of the DOX in the effluent solution was also measured by ultraviolet-visible spectrophotometer. The results are shown in FIG. 7.

Figure 7:
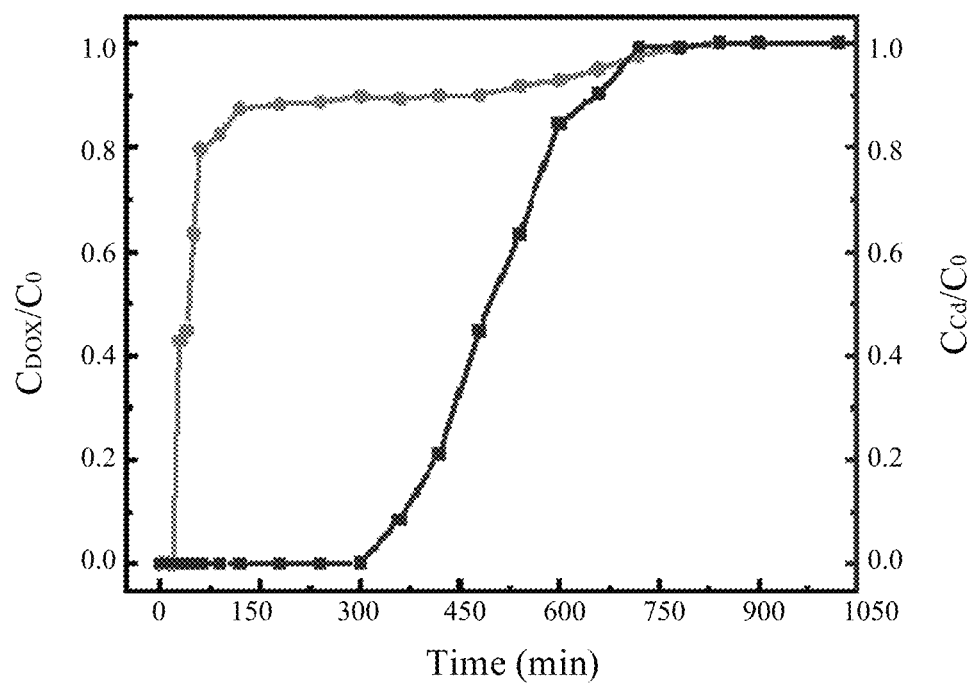
FIG. 7 illustrates the adsorption breakthrough curve of a mixed solution containing Cd2+ in 10 mg/L and doxorubicin hydrochloride (DOX) in 1 mg/L in Example 3.

Application Effects:

As can be seen from FIG. 7 the mixed solution containing Cd2+ in 10 mg/L and doxorubicin hydrochloride (DOX) in 1 mg/L was continuously fed into the experimental column at the flow rate of 0.5 ml/min. The ratio of the concentration of each of Cd2+ and DOX in simulated solution at the time of flowing out of the experimental column to the concentration of thereof at the water inlet changed with time. The Cd2+ and DOX retention time in the experimental column was 240 min and 20 min, respectively. In the case of mixed pollution, the DOX can be adsorbed more quickly than Cd2+.

It is understandable that the applications of the present disclosure are not limited to the above examples. Those skilled in the art can make improvements or variations based on the above description, and all these improvements and variations should fall within the scope of protection of the appended claims.

What is claimed is:

1. A method for stabilizing heavy metals and antibiotics in a continuous flow of to-be-treated sewage through mineralization of calcium phosphate, the method comprising:
   generating a calcium salt stock solution and a phosphate stock solution by dissolving a calcium salt and a phosphate in Tris buffers respectively;
   adding a polymer into the calcium salt stock solution to obtain a mineralizing solution;
   immersing collagen into the mineralizing solution and performing ultrasonic treatment, and then adding the phosphate stock solution to adjust a final concentration ratio of the calcium salt and the phosphate to be greater than or equal to 1.67, thereby obtaining a mixed solution as an initial mineralizing solution;
   pumping the initial mineralizing solution into a packed column, wherein a tail of the packed column is provided with a semi-permeable membrane impermeable to the polymer and minerals; and
   pumping the to-be-treated sewage into the packed column, and solidifying and removing heavy metals and antibiotics in the to-be-treated sewage during mineralization of calcium phosphate.

2. The method as claimed in claim 1, wherein the calcium salt is one or more selected from $CaCl_2$, $Ca(NO_3)_2$ and $CaSO_4$, and the phosphate is $K_2HPO_4$.

3. The method as claimed in claim 1, wherein a concentration of the calcium salt in the mixed solution is 5 mM-10 mM, and a concentration of the phosphate in the mixed solution is 2 mM-6 mM.

4. The method as claimed in claim 1, wherein the polymer is one or more selected from polyacrylic acid, polyglutamic acid, and polyaspartic acid.

5. The method as claimed in claim 1, wherein a concentration of the collagen in the mixed solution is 0.1 g/L-20 g/L.

6. The method as claimed in claim 1, wherein the semi-permeable membrane is provided at a water outlet of the packed column, and the semi-permeable membrane is configured to allow water molecules and ions to penetrate through.

7. The method as claimed in claim 1, wherein the packed column is filled with an auxiliary material prior to pumping the initial mineralizing solution into a packed column, and the auxiliary material is one or more selected from quartz sand, zeolite, ceramsite, and activated carbon.

8. The method as claimed in claim 7, wherein a porosity of the packed column is 30%-75%, and a packing density of the auxiliary material in the packed column is 1.2 g/cm3-3.2 g/cm3.

9. The method as claimed in claim 1, wherein a flow rate of the to-be-treated sewage in the packed column is 0.15 mL/min-0.9 mL/min.

\* \* \* \* \*